(12) United States Patent
DeRees

(10) Patent No.: US 6,394,537 B1
(45) Date of Patent: May 28, 2002

(54) ARRANGEMENT FOR ATTACHING A PLASTIC VEHICLE BODY TO A METAL FRAME AND RELATED METHOD

(75) Inventor: Delbert D DeRees, Romeo, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/774,919

(22) Filed: Jan. 31, 2001

(51) Int. Cl.[7] .................................................. A61G 3/00
(52) U.S. Cl. ........................ 296/191; 296/29; 296/35.1; 296/187; 52/573.1
(58) Field of Search .................................. 296/187, 198, 296/191, 35.1, 901, 29; 52/573.1

(56) References Cited

U.S. PATENT DOCUMENTS

| | | |
|---|---|---|
| 1,835,243 A | 12/1931 | Schaffert |
| 3,301,121 A | 1/1967 | Newcomer |
| 3,894,608 A | 7/1975 | Haenle |
| 4,238,165 A | 12/1980 | Wagner |
| 4,435,112 A | 3/1984 | Becker |
| 4,529,244 A * | 7/1985 | Zaydel ................... 296/191 X |
| 4,573,733 A * | 3/1986 | Zaydel ................... 296/191 X |
| 4,717,302 A | 1/1988 | Adams et al. |
| 4,912,826 A * | 4/1990 | Dixon et al. ............ 296/187 X |
| 4,941,769 A | 7/1990 | Natsume |
| 4,973,102 A * | 11/1990 | Bien .......................... 296/187 |
| 5,040,917 A | 8/1991 | Camuffo |
| 5,447,399 A | 9/1995 | Yoshida et al. |
| 5,964,490 A * | 10/1999 | Schroeder et al. ..... 296/35.1 X |

* cited by examiner

*Primary Examiner*—Stephen T. Gordon
*Assistant Examiner*—Patricia Engle
(74) *Attorney, Agent, or Firm*—Ralph E. Smith

(57) ABSTRACT

A plastic vehicle body attachment system for a motor vehicle. The attachment system includes a metal support, a plastic panel having an aperture, and a fastener. The fastener is disposed in the aperture and detachably couples the plastic panel to the metal support. The fastener is smaller than the aperture by an amount that varies in relation to the distance between the fastener and a fixed point on the composite panel such that the size of the aperture increases as the distance between the fastener and the fixed point increases.

20 Claims, 5 Drawing Sheets

SHRINKAGE AT
−40°F

EXPANSION AT
+210°F

ARRANGEMENT FOR ATTACHING A PLASTIC VEHICLE BODY TO A METAL FRAME AND RELATED METHOD

BACKGROUND OF THE INVENTION

1. Technical Field

The present invention generally pertains to a method and apparatus for attaching a composite plastic vehicle body to a metal frame. More specifically, but without restriction to the particular embodiment and/or use which is shown and described for purposes of illustration, the present invention pertains to an arrangement for attaching a plastic vehicle body to a metal frame which incorporates a variety of fasteners and metal spacers in a predetermined spatial relation and a related method.

2. Discussion

The use of plastic materials in motor vehicles has increased greatly in the recent past and the trend continues. For example, many original equipment manufacturers are attempting to implement plastic panels where metal stampings were traditionally used. Due to the very high cost of stamping large metal panels, manufacturers have exhibited a special interest in the largest vehicle body panel, the floor panel.

Creating a motor vehicle floor panel from composite plastic materials poses a formidable design challenge for at least three reasons. Firstly, the vehicle body must be secured to a load bearing structure such as a traditional metal frame. Accordingly, a fastening arrangement capable of securely fixing the composite plastic floor panel to the frame without crushing or otherwise permanently damaging the composite plastic is required. In addition, a composite material phenomenon known as "creep" must be addressed. When plastic creeps, the material slowly moves from areas of high compressive stress to areas of low stress. The threaded fasteners commonly used to mount vehicle bodies to undercarriages or frames are capable of very high compressive stress under the fastener head after proper installation. The clamping force generated by the fastener is directly proportional to the amount of fastener elongation induced at installation. Accordingly, any movement of composite plastic material away from the area beneath a fastener head reduces the fastener compressive load (elongation) and also significantly reduces the clamp load as initially applied because of the composite material creep or deformation under a compressive load.

Secondly, other structures such as seat frames and passenger seat belt brackets must be rigidly connected to the vehicle in order to ensure passenger safety by sustaining the dynamic loading under use. The use of a plastic vehicle body increases the difficulty of this task because plastics generally do not exhibit compressive strength, tensile strength or bending strength as great as steel or other suitable applied metals.

Lastly, the engineering composite plastic materials in use today tend to exhibit a coefficient of linear thermal expansion (CLTE) much greater than that of steel. Therefore, care must be taken to accommodate a greater change in panel size per change in temperature, especially where the plastic body panel and metal members meet.

Existing designs have attempted to address the issue of lower strengths and creep within highly loaded composite plastic panels. For example, one such design incorporates a fastener including a metal sleeve embedded in the composite plastic component to react the loads introduced by fasteners such as bolts and rivets. While this concept has had commercial success, other issues need to be addressed. Specifically, the thermal expansion associated with temperature changes within large plastic panels still poses a risk of buckling or other material or mechanical failures. In an attempt to implement as many plastic components as possible while maintaining structural integrity, manufacturers have limited the length of the plastic panels in order to limit the associated thermal expansion differential. While this method has been effective, a patchwork of smaller panels is undesirable compared to the advantages obtained by utilizing one homogenous body panel such as a roof, a floor panel, door panels, or outer/inner body panels.

Accordingly, it is a general object of the present invention to provide an arrangement for attaching a plastic vehicle body to a metal frame which overcomes the disadvantages of the prior art.

It is another object of the present invention to provide a plastic vehicle body attachment system capable of interconnecting a variety of components exhibiting different coefficients of linear thermal expansion.

It is yet another object of the present invention to manage the amount of expansion at selected mechanical interfaces without degrading the overall structural load carrying abilities of each component of the system.

Additional benefits and advantages of the present invention will become apparent to those skilled in the art to which this invention relates from a reading of the subsequent description of the preferred embodiment and the appended claims, taken in conjunction with the accompanying drawings.

SUMMARY OF THE INVENTION

In one form, the present invention provides a plastic vehicle body attachment system for a motor vehicle. The attachment system includes a metal support, a plastic panel having an aperture, and a fastener. The fastener is disposed in the aperture and detachably couples the plastic panel to the metal support. The fastener is smaller than the aperture by an amount that varies in relation to the distance between the fastener and a fixed point on the composite panel such that the size of the aperture increases as the distance between the fastener and the fixed point increases.

In another form, the present invention provides a method of securing a first panel to a second panel including the following general steps:
- determining a first coefficient of thermal expansion of said first panel;
- determining a second coefficient of thermal expansion of said second panel;
- measuring a distance from a reference point to an attachment point;
- providing a fastener;
- providing an aperture in said first panel;
- determining a clearance between said fastener and said aperture which varies according to said distance; and
- passing said fastener through said aperture to secure said first panel to said second panel.

DETAILED DESCRIPTION OF THE PREFERRED EMBODIMENTS

Figure 1:
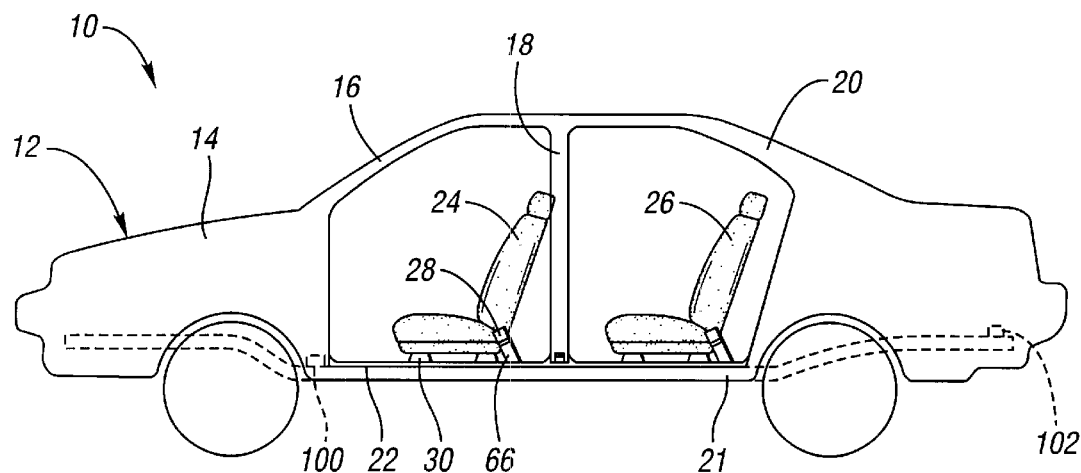
FIG. 1 is a simplified side view of a vehicle constructed in accordance with the teachings of the present invention.

Referring initially to FIG. 1, an arrangement for attaching a plastic vehicle body to a metal frame is depicted at reference numeral 10. The arrangement, or attachment system 10, is shown operatively associated with an exemplary motor vehicle 12. In the preferred embodiment, vehicle 12 has a body 14 including a forward pillar or A-pillar 16, a center pillar or B-pillar 18 and a rearward pillar or C-pillar 20 coupled to a frame 21. Body 14 also includes exterior panels (not specifically shown) and a plastic floor panel 22.

Vehicle 12 further includes interior components such as a forward seat 24, a rear seat 26, and a seat belt 28 coupled to the frame 21 via the attachment system 10. The forward seat 24 includes seat legs 30 coupled to the plastic floor panel 22 and the vehicle frame 21.

Figure 2:
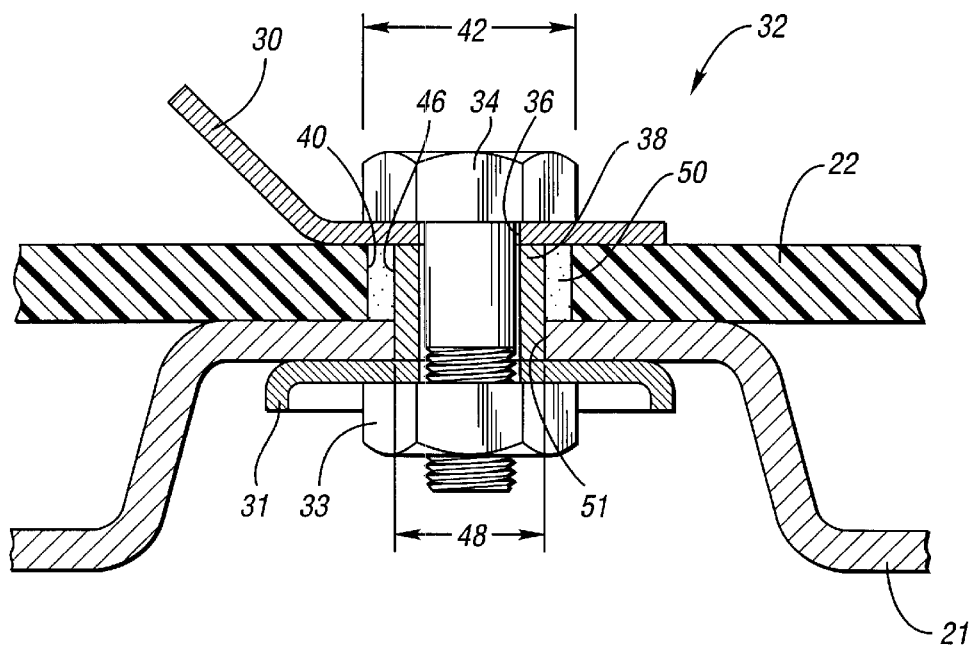
FIG. 2 is a sectional view of an exemplary mount constructed in accordance with the teachings of the present invention.

Referring particularly to FIG. 2, an exemplary mount 32 includes vehicle seat leg 30, floor panel 22, a threaded fastener 34, frame 21, a washer 31 and a nut 33. Attachment system 10 includes a plurality of substantially identical mounts 32, as will be described in greater detail hereinafter. To couple vehicle seat leg 30 to vehicle frame 21, threaded fastener 34 is disposed within an aperture 36 of seat leg 30. Fastener 34 includes a generally cylindrical metal spacer 38 disposed within a panel aperture 40 having an inner diameter 42 defined by an inner surface of floor panel 22. Metal spacer 38 has an outer surface 46 defining an outside diameter 48 which defines a fastener diameter. Metal spacer 38 and aperture 40 are sized such that a gap 50 is equally disposed along outer surface 46. The magnitude of gap 50 is determined by subtracting inner diameter 42 from outside diameter 48 and dividing by 2.

Gap 50 is greater than the amount of clearance normally provided between a conventional fastener and fastener aperture to accommodate for the plastic panel coefficient of linear thermal expansion being greater than the coefficient of linear thermal expansion for steel. Because temperature variations ranging from −40° C. to 100° C. are not uncommon in automotive applications, care must be taken to account for the resulting changes in component size.

In FIG. 2, metal spacer 38 is shown protruding through vehicle frame 21 and disposed in an aperture 51 provided therein. Alternatively, metal spacer 38 may extend through plastic floor panel 22 but not vehicle frame 21. One skilled in the art will appreciate that such an arrangement is within the scope of the present invention.

Figure 3:
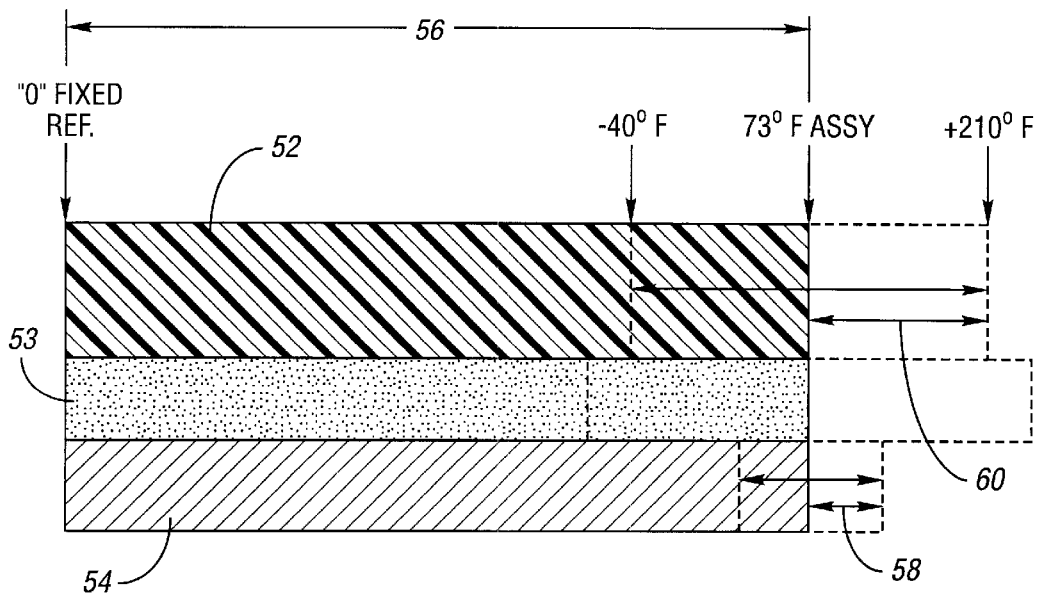
FIG. 3 is a graph depicting materials exhibiting different linear coefficients of thermal expansion.

Referring particularly to FIG. 3, a plastic panel 52, a layer of adhesive 53 and a steel panel 54 are shown to have equivalent initial lengths 56 at room temperature. For each panel, the change in unit length per degree change in temperature is defined by the following equation:

$$\Delta l = \alpha l \Delta T$$

where $\Delta l$=the change in panel length
$\alpha$=coefficient of linear expansion
l=length
$\Delta T$=change in temperature FIG. 3 reflects the change in panel lengths for a given temperature change. For example, if the initial length 56 were equal to 750 mm, and temperature of the mount 32 were to increase 20 degrees Celsius, the length of the steel panel 54 would increase a distance 58. The distance is calculated as follows:

$$\Delta l = (11 \times 10^{-6}/° \text{ C.}) \times (750 \text{ mm}) \times (20° \text{ C.}) = 0.17 \text{ mm}$$

Where the coefficient of linear expansion for steel=$11 \times 10^{-6}/°$ C. For the same twenty degree increase in temperature, the initial length 56 of the plastic panel 52 would increase a distance 60. The distance is calculated as follows:

$$\Delta l = (60 \times 10^{-6}/° \text{ C.}) \times (750 \text{ mm}) \times (20° \text{ C.}) = 0.9 \text{ mm}$$

As described above, the difference in the coefficients of linear thermal expansion results in the length increase 60 which is substantially greater than the length increase 58 of the steel panel 54.

Gap 50 is calculated as a function of the coefficient of linear thermal expansion of frame 21, the coefficient of linear thermal expansion of plastic floor panel 22, and the length of the respective components. Accordingly, an optimized attachment system 10 may be implemented by minimizing the distance between a fixed reference and the mounts 32 of greatest structural concern. As mentioned earlier, the passenger seat and passenger seat belt mounts must be structurally sound and fatigue resistant in order to function properly. Therefore, to implement the aforementioned design strategy, a fixed reference or zero point must be defined. Based on the location of the passenger seats within the motor vehicle 12, the central location of the B-pillar 18 provides an excellent zero point. It should also be appreciated that one or more of the seat to frame interconnections may be used as a fixed reference point.

The use of fiber-reinforced plastics within the floor panel 22 adds another degree of difficulty for providing an arrangement for attaching a plastic panel to a metal frame. Specifically, floor panel 22 exhibits a different rate of thermal expansion for each axis within the Cartesian coordinate system. Once the coefficients of linear expansion for each Cartesian coordinate axis have been determined, a model may be constructed to predict the amount of clearance required between the metal spacer 38 and the aperture 40.

Figure 5:
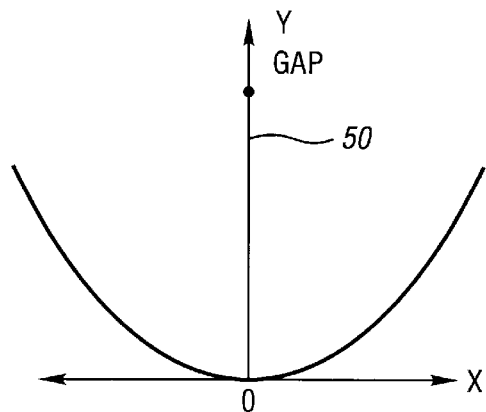
FIG. 5 is a graph depicting the relation between the magnitude of clearance between a fastener and a panel and the distance between the fastener and the B-pillar.

FIG. 5 is a graphical depiction of such a model providing the desired gap 50 on the Y axis. The X axis represents the distance between the B-pillar 18 and the center of mount 32.

Figure 4:
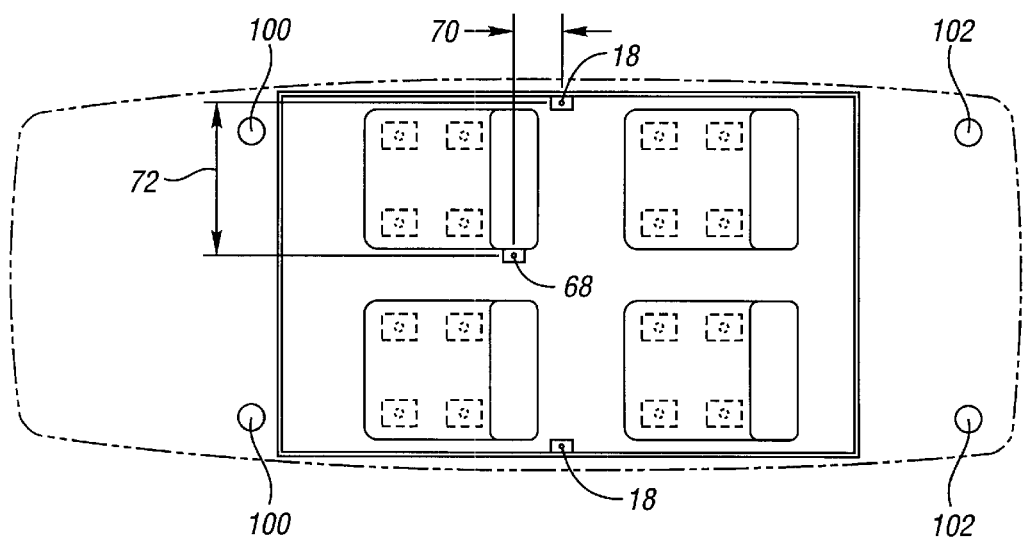
FIG. 4 is a partial sectional top view of a vehicle constructed in accordance with the teachings of the present invention.

Referring to FIGS. 1 and 4, a seat belt bracket 66 is mounted at location 68 defining a longitudinal distance 70 and a transverse distance 72 from the center of the fixed point, in this example, B-pillar 18. The longitudinal distance 70 is then input to the model defined at FIG. 5 to predict the amount of clearance required. Accordingly, transverse distance 72 is entered into a similar model. One skilled in the art will appreciate that the model defined in FIG. 5 incorporates the thermal expansion coefficient correlating to expansion of floor panel 22 in the longitudinal direction while the model accepting the input of the transverse distance 72 utilizes the transverse coefficient of linear expansion for plastic floor panel 22. After each model outputs desired gap 50, the clearance between metal spacer 38 and aperture 40 is defined as gap 50 multiplied by two. In order to accommodate both longitudinal and transverse expansion of floor panel 22 within one mount 32, the larger clearance estimate is utilized. In the exemplary embodiment, aperture 36 is circular. Alternatively, aperture 36 may be in the shape of an oval or a slot having a first dimension for the longitudinal expansion and a second dimension for the transverse expansion.

Another structure implementing attachment system 10 of the present invention is forward seat 24. As shown in FIG. 4, forward passenger seat 24 is secured to the vehicle by four mounts 32A, 32B, 32C and 32D. One skilled in the art will appreciate that since each of mounts 32A-D have a unique longitudinal and transverse position relative to the B-pillar 18, each mount will preferably require a unique gap 50 between metal spacer 38 and plastic floor panel aperture 40.

Figure 6:
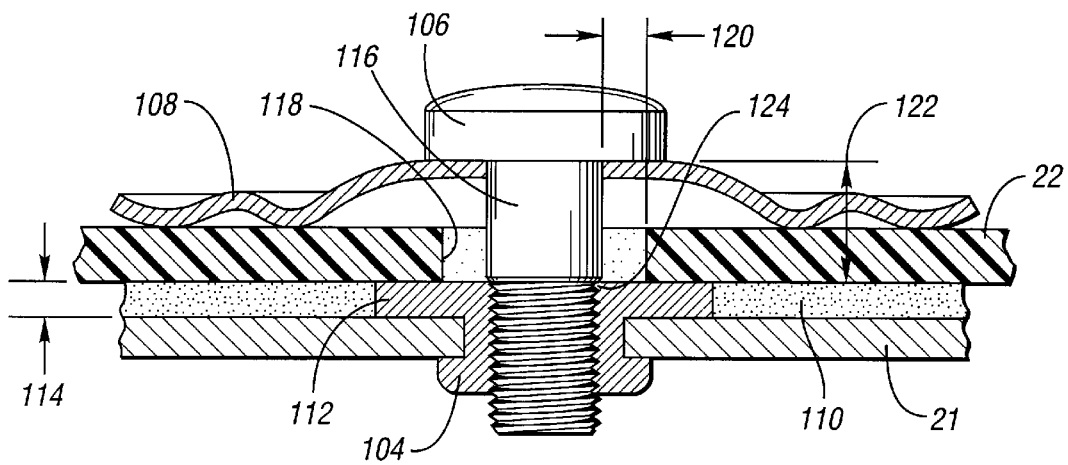
FIG. 6 is a partial cross-sectional view of another mount embodiment constructed in accordance with the teachings of the present invention.

With reference to FIGS. 1, 4 and 6, attachment system 10 may also be implemented at a forward body to frame interconnection 100 and/or a rear body to frame interconnection 102. It should be appreciated that body to frame interconnection 100 is substantially similar to body to frame interconnection 102. Accordingly, only body to frame interconnection 100 will be described in detail.

Figure 7:
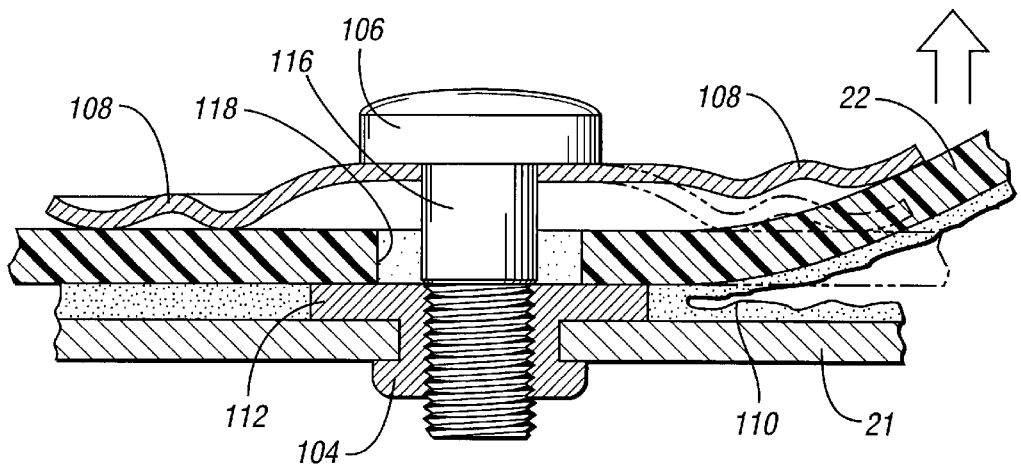
FIG. 7 is a partial cross-sectional view of a mount depicting a peeling condition.

Interconnection 100 includes frame 21, composite floor panel 22, a nut 104, a shoulder bolt 106, a spring washer 108 and a layer of elastomeric adhesive 110. Interconnection 100 is preferably used in conjunction with a mount 111 (FIG. 10) fixing floor panel 22 and frame 21 at a location corresponding to a seat leg position, as previously described. Elastomeric adhesive 110 bonds floor panel 22 and frame 21 to resist separation or "peeling" as shown in FIG. 7. However, elastomeric adhesive 110 is formulated to allow relative sliding between floor panel 22 and frame 21 during thermal loading. Nut 104 includes a flange 112 having a thickness 114 equal to an optimum thickness of elastomeric adhesive 110. It should be appreciated that a spacer 113 (FIG. 10) may be utilized in place of flange 112 if a standard nut is preferred. Nut 104 may be welded, crimped or otherwise affixed to frame 21 to prevent relative rotation thereto. One skilled in the art will appreciate that FIG. 6 depicts a nominal installation at room temperature where a body portion 116 of shoulder bolt 106 is centrally disposed within an aperture 118 of floor panel 22. Aperture 118 has a size greater than body portion 116 thereby defining a nominal gap 120 between the body 116 and aperture 118.

Body portion 116 of shoulder bolt 106 has a predetermined length 122 terminating at a shoulder 124. During the assembly process, shoulder 124 is driven into contact with flange 112 of nut 104. At this time, spring washer 108 is compressed a predetermined amount to exert a specified load upon floor panel 22. In this manner, shoulder bolt 106 and spring washer 108 form an "anti-peel" device resisting separation of floor panel 22 and frame 21 ( FIG. 7).

Figure 8:
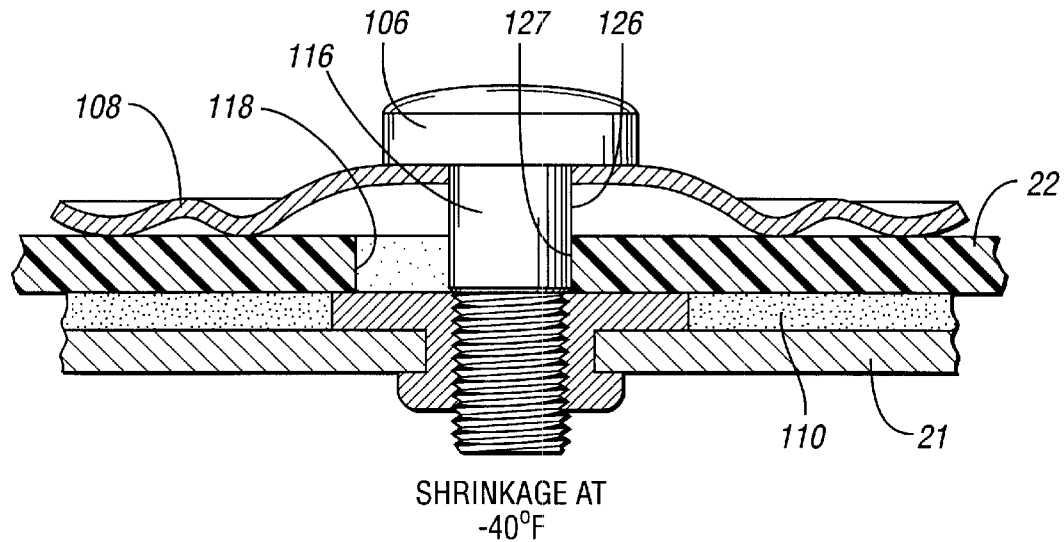
FIG. 8 is a partial cross-sectional view depicting relative component location during shrinkage.
Figure 9:
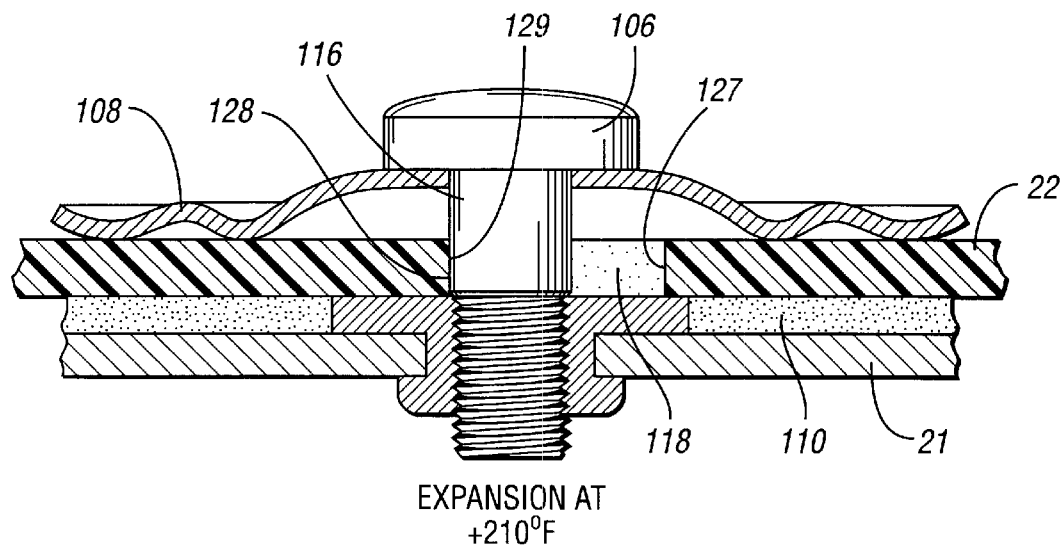
FIG. 9 is a partial cross-sectional view depicting component location during maximum expansion.

FIGS. 8 and 9 depict the relative location of the aforementioned components during operating temperatures other than nominal. Specifically, FIG. 8 represents a minimum component size condition at approximately a −40° C. where an edge 126 of body 116 contacts an edge 127 of aperture 118. Similarly, FIG. 9 depicts a maximum expansion condition at approximately 100° C. where an edge 128 of body 116 contacts an edge 129 of aperture 118.

Figure 10:
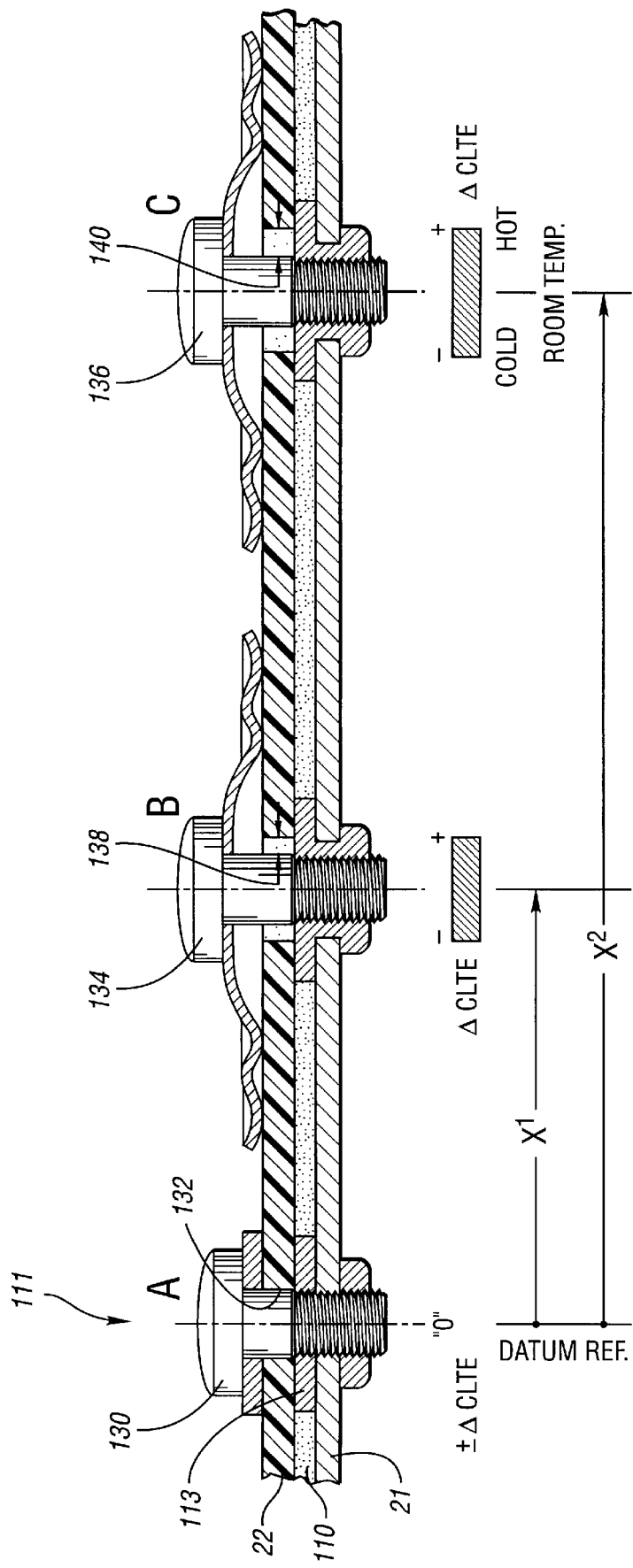
FIG. 10 is a partial cross-sectional view of a vehicle incorporating more than one mount constructed in accordance with the teachings of the present invention.

With reference to FIG. 10, a more complex system of attachment may be devised where a first fastener 130 is disposed within an aperture 132 of floor panel 22 having only a minimal clearance therebetween. As previously described, as the distance from fixed mount 111 including first fastener 130 increases, the quantity of thermal expansion for each panel also increases. Accordingly, as the distance (x) from fixed first fastener 130 increases, the differential in distance expanded between the metal frame and the composite floor ($\Delta$CLTE) also increases. Therefore, and as shown in FIG. 10, a second or intermediate fastener 134 will require less initial clearance between the fastener and the floor panel aperture than a third fastener 136 positioned a greater distance from fixed fastener 130 than intermediate fastener 134. The increasing differential in distance expanded ($\Delta$CLTE) is accommodated by providing a gap 138 between second fastener 134 and floor panel 22 and a larger gap 140 between third fastener 136 and floor panel 22.

While the invention has been described in the specification and illustrated in the drawings with reference to one or more preferred embodiments, it will be understood by those skilled in the art that various changes may be made and equivalents may be substituted for elements thereof without departing from the scope of the invention as defined in the claims. Therefore, it is intended that the invention not be limited to the particular embodiments illustrated by the drawings and described in the specification, but that the invention will include any embodiments falling within the description of the appended claims.

What is claimed is:

1. A composite plastic vehicle body attachment system in combination with a motor vehicle having a metal support, the composite vehicle body attachment system comprising:
   a composite plastic panel having a panel aperture; and
   a fastener disposed in said aperture detachably coupling said composite plastic panel to said metal support wherein a clearance exists between said fastener and said aperture, said clearance varying in relation to a distance between said fastener and a fixed composite plastic panel to metal support interconnection such that said clearance increases as said distance between said fastener and said fixed interconnection increases.

2. The composite plastic vehicle body attachment system of claim 1, further including an adhesive bond between said composite plastic panel and said metal support and further including a spring washer positioned between said fastener and said composite plastic panel, whereby said spring washer reduces a tendency of said composite plastic panel to peel away from said metal support.

3. The composite plastic vehicle body attachment system of claim 2 further including a spacer positioned between said metal support and said composite plastic panel, said spacer having a thickness defining a thickness of adhesive present between said metal support and said composite plastic panel.

4. The composite plastic vehicle body attachment system of claim 3, further including a bracket having a bracket aperture, said fastener disposed in said bracket aperture for detachably interconnecting said bracket to said composite plastic panel and said metal support.

5. The composite plastic vehicle body attachment system of claim 4, wherein said clearance increases non-linearly as the distance between said fastener and said fixed interconnection increases.

6. The composite plastic vehicle body attachment system of claim 5 wherein said aperture is circular.

7. The composite plastic vehicle body attachment of claim 1 wherein said fastener includes a metal sleeve disposed within said aperture.

8. An attachment system for interconnecting dissimilar materials in a vehicle, the attachment system comprising:
- a first panel constructed from a first material, said first panel having an aperture extending therethrough;
- a second panel constructed from a second material;
- a first fastener fixing said first panel to said second panel at a first location;
- a second fastener slidably interconnecting said first panel and said second panel at a second location, said second fastener positioned within said aperture to define a clearance between said fastener and said aperture, said clearance increasing as a distance between said first location and said second location increases.

9. The attachment system of claim 8 further including a spring washer positioned between said second fastener and one of said first and second panels.

10. The attachment system of claim 9 further including an adhesive coupling said first and second panels.

11. The attachment system of claim 10 further including a spacer positioned between said first and second panels to define a thickness of said adhesive.

12. The attachment system of claim 11 wherein said second fastener is positioned to compress said spring washer a predetermined amount thereby distributing a specified load across said one of said first and second panels.

13. The attachment system of claim 12 wherein said second fastener is a shoulder bolt.

14. A method of securing a first panel to a second panel, the method comprising:
- determining a first coefficient of thermal expansion of said first panel;
- determining a second coefficient of thermal expansion of said second panel;
- measuring a distance from a reference point to an attachment point;
- providing a fastener having a fastener diameter;
- providing an aperture in said first panel;
- determining a clearance between said fastener and said aperture which varies according to said distance; and
- passing said fastener through said aperture to secure said first panel to said second panel.

15. The method of securing a first panel to a second panel of claim 14 further including adhesive bonding said first panel to said second panel.

16. The method of securing a first panel to a second panel of claim 15 further including biasedly engaging a spring washer with said first panel.

17. The method of securing a first panel to a second panel of claim 16 wherein said clearance increases as said distance increases.

18. The method of securing a first panel to a second panel of claim 14, wherein said step of measuring a distance from a reference point to an attachment point includes the step of measuring a distance from a vehicle B-pillar to said attachment point.

19. The method of securing a first panel to a second panel of claim 14, wherein said clearance varies non-linearly relative to said distance.

20. The method of securing a first panel to a second panel of claim 14, wherein said aperture is a diameter.

* * * * *